United States Patent
Jeong et al.

(10) Patent No.: US 12,005,838 B2
(45) Date of Patent: Jun. 11, 2024

(54) MOUNT BASE FOR REARVIEW MIRROR

(71) Applicants: HYUNDAI MOTOR COMPANY, Seoul (KR); KIA CORPORATION, Seoul (KR); JAE HWA INDUSTRY CO., LTD, Bucheon-si (KR); HANKUK SEKURIT LTD., Gunsan-si (KR)

(72) Inventors: Gi Heon Jeong, Suwon-si (KR); Tae Soo Jung, Siheung-si (KR); Ju Hee Park, Gunsan-si (KR); Nam Sup Kim, Siheung-si (KR)

(73) Assignees: HYUNDAI MOTOR COMPANY, Seoul (KR); KIA CORPORATION, Seoul (KR); JAE HWA INDUSTRY CO., LTD, Bucheon-si (KR); HANKUK SEKURIT LTD., Gunsan-si (KR)

( * ) Notice: Subject to any disclaimer, the term of this patent is extended or adjusted under 35 U.S.C. 154(b) by 279 days.

(21) Appl. No.: 17/349,689

(22) Filed: Jun. 16, 2021

(65) Prior Publication Data
US 2022/0097606 A1 Mar. 31, 2022

(30) Foreign Application Priority Data
Sep. 29, 2020 (KR) .................. 10-2020-0127571

(51) Int. Cl.
*B60R 1/04* (2006.01)

(52) U.S. Cl.
CPC ..................... *B60R 1/04* (2013.01)

(58) Field of Classification Search
CPC ....... B60R 1/04; B60R 1/06; B60R 2011/004; B60R 2011/005; B60J 1/18; B60Y 2410/125; B60Y 2410/13
USPC ....................................... 359/871
See application file for complete search history.

(56) References Cited

U.S. PATENT DOCUMENTS

2010/0277821 A1* 11/2010 Roth ................. B60R 1/04
359/872

OTHER PUBLICATIONS

Examiner provided machine translation of Kwanhui et al. (KR 102109386) (Year: 2020).*

* cited by examiner

*Primary Examiner* — Balram T Parbadia
*Assistant Examiner* — Rahman Abdur
(74) *Attorney, Agent, or Firm* — Lempia Summerfield Katz LLC

(57) ABSTRACT

A mount base for a rearview mirror includes: a base body including a first material; and an insert embedded in the base body and including a second material. The base body has a first surface and a second surface opposing the first surface, the insert has a first surface and a second surface opposing the first surface, the first material is softer than the second material, and the second material has higher stiffness than the first material.

17 Claims, 16 Drawing Sheets

MOUNT BASE FOR REARVIEW MIRROR

CROSS-REFERENCE TO RELATED APPLICATION

This application is based on and claims the benefit of priority to Korean Patent Application No. 10-2020-0127571, filed on Sep. 29, 2020, in the Korean Intellectual Property Office, the disclosure of which is incorporated herein in its entirety by reference.

TECHNICAL FIELD

The present disclosure relates to a mount base for a rearview mirror, and more particularly, to a mount base for a rearview mirror capable of achieving high stiffness and weight reduction and having high resistance to deformation.

BACKGROUND

A rearview mirror allows the driver to see rearward through the vehicle's rear windshield.

Referring to FIG. 1, the rearview mirror includes a mirror mount 2 mounted on a top end of a windshield 6 and a mirror assembly 1 pivotally mounted to the mirror mount 2 through a mounting arm 3. The mirror mount 2 may have a cavity, and a mount base 4 may be received in the cavity of the mirror mount 2. The mount base 4 may be fixed to an interior surface of the windshield 6 by a screw 5. The mirror assembly 1 and the mounting arm 3 may be coupled to the windshield 6 by the mirror mount 2. The mount base 4 may be made of a metal material such as a sintered stainless steel alloy, and the mount base 4 may be fixed to the interior surface of the windshield 6 by the screw 5.

As stated above, as the mount base 4 according to the related art is made of the metal material and is fixed to the windshield 6 by the screw 5, severe rattle noise may be generated during the vehicle's driving, and rust or corrosion may occur. In addition, as the related art mount base 4 is made of the sintered stainless steel alloy, the manufacturing cost thereof increases, and the weight thereof is relatively heavy compared to a plastic mount base having the same size.

In addition, the related art mount base 4 may fail to effectively distribute stress when the screw 5 is fastened, and accordingly, there is a risk of damage to the windshield 6.

The above information described in this background section is provided to assist in understanding the background of the inventive concept, and may include any technical concept which is not considered as the prior art that is already known to those having ordinary skill in the art.

SUMMARY

The present disclosure has been made to solve the above-mentioned problems occurring in the prior art while maintaining advantages achieved by the prior art.

An aspect of the present disclosure provides a mount base for a rearview mirror capable of achieving high stiffness and weight reduction, having high resistance to deformation, and being manufactured at relatively low cost.

According to an aspect of the present disclosure, a mount base for a rearview mirror may include: a base body including a first material; and an insert embedded in the base body and including a second material. The base body may have a first surface and a second surface opposing the first surface, the insert may have a first surface and a second surface opposing the first surface, the first material may be softer than the second material, and the second material may have higher stiffness than the first material.

The insert may include a plurality of holes.

The insert may include a plurality of recesses provided in a side edge and/or end portion thereof.

The insert may include a slot provided in the center thereof, and a longitudinal axis of the slot may be aligned with a longitudinal axis of the insert.

The insert may further include a closed wall by which the slot is closed.

The mount base may further include a third material with which the slot is filled. The third material may be the same material as the first material or be softer than the first material.

A thickness of the insert may be less than that of the base body.

The first surface of the insert may be offset from the first surface of the base body toward the second surface of the base body. The second surface of the insert may be offset from the second surface of the base body toward the first surface of the base body.

The first surface of the insert may be offset from the first surface of the base body toward the second surface of the base body. The second surface of the insert may be flush with the second surface of the base body.

The first surface of the insert may be flush with the first surface of the base body. The second surface of the insert may be offset from the second surface of the base body toward the first surface of the base body.

The insert may be curved with a predetermined curvature.

The insert may further include a transverse rib extending along a width direction of the insert and a longitudinal rib extending along a longitudinal direction of the insert.

The insert may further include at least one support projection extending from an end portion of the insert to an end portion of the base body.

The mount base may further include at least one stress absorbing member embedded in the base body. The stress absorbing member may include a fourth material, which is softer than the first material, and the stress absorbing member may be aligned with a slot of the insert.

The mount base may further include a first stress absorbing member embedded in the base body and aligned with a slot of the insert. The first stress absorbing member may contact the first surface of the insert.

The mount base may further include a second stress absorbing member embedded in the base body and aligned with a slot of the insert. The second stress absorbing member may contact the second surface of the insert.

The mount base may further include a plurality of air layers aligned with a slot of the insert within the base body.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
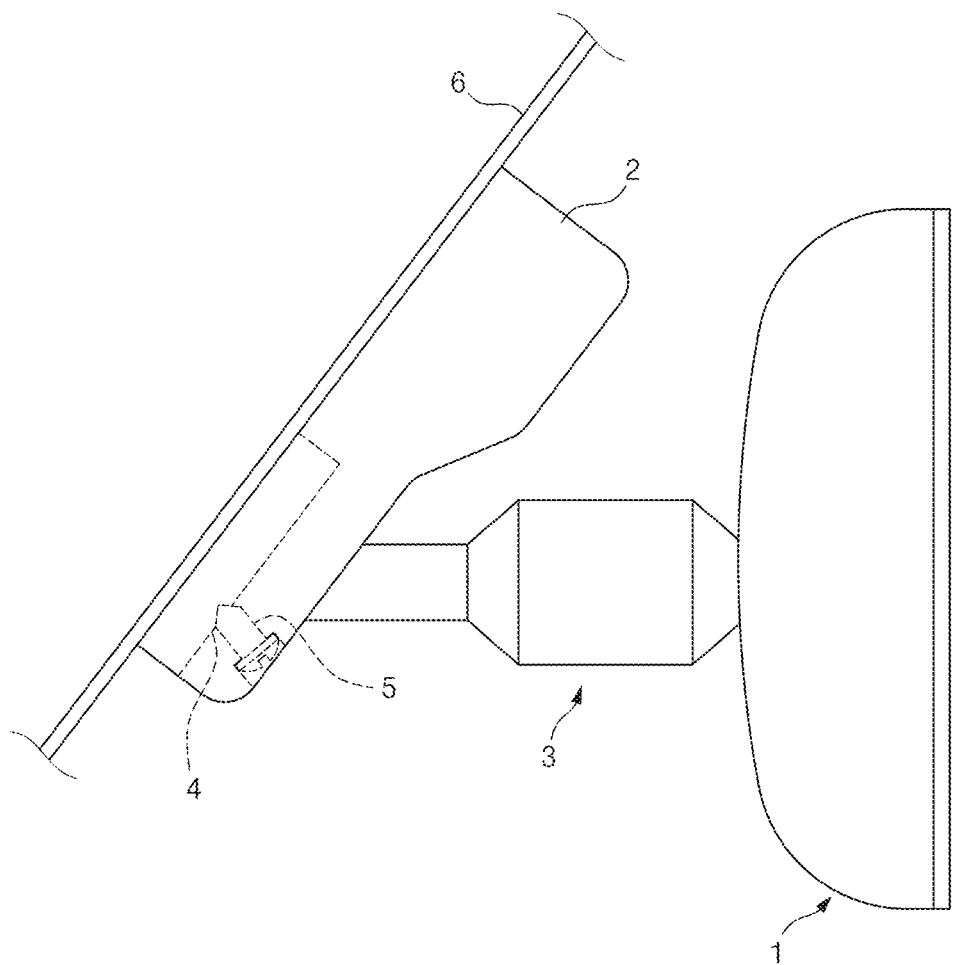
FIG. 1 illustrates a rearview mirror as is known in the art.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those having ordinary skill in the field of art to which the present disclosure belongs. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

Figure 2:
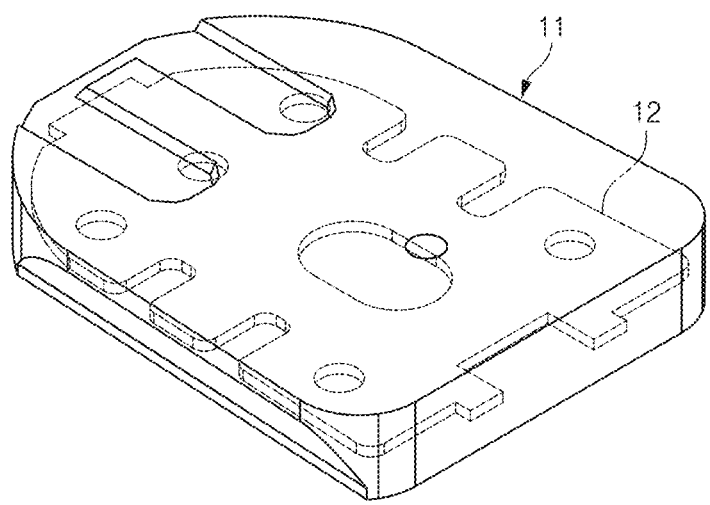
FIG. 2 illustrates a mount base for a rearview mirror according to an embodiment of the present disclosure.
Figure 3:
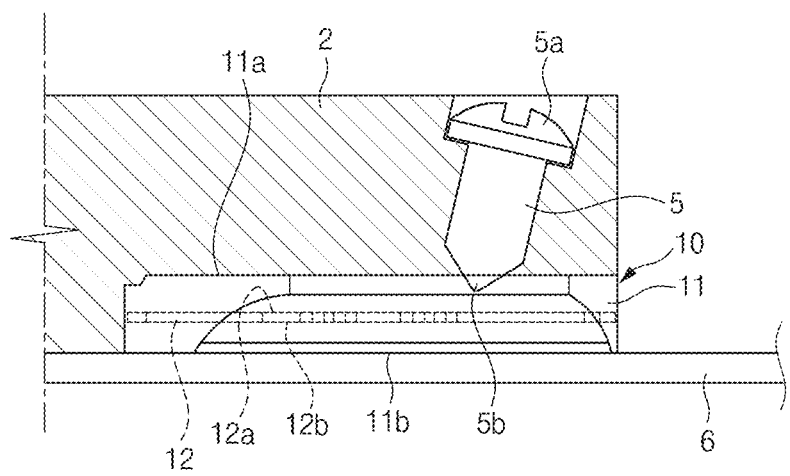
FIG. 3 illustrates a cross-sectional view of a mount base for a rearview mirror according to an embodiment of the present disclosure, the mount base being is fixed to a windshield by a screw.

Referring to FIGS. 2 and 3, a mount base 10 for a rearview mirror according to an embodiment of the present disclosure may include a base body 11 and an insert 12 embedded in the base body 11.

The base body 11 may include a first material. Specifically, the first material may be made of a resin material which is non-metallic, and thus the mount base 10 may achieve weight reduction, increased profitability, and improved quality. According to a specific embodiment of the present disclosure, the first material of the base body 11 may be a composite material such as carbon fiber-reinforced polymer (CFRP) to ensure mold dimensional stability, strength/stiffness, etc.

Referring to FIG. 3, the base body 11 may have a first surface 11a and a second surface 11b opposing the first surface 11a. Specifically, the first surface 11a may face the interior of the vehicle, and the second surface 11b may face a windshield 6. The second surface 11b of the base body 11 may directly contact the windshield 6. The insert 12 may have a first surface 12a facing the interior of the vehicle and a second surface 12b facing the windshield 6.

Figure 5:
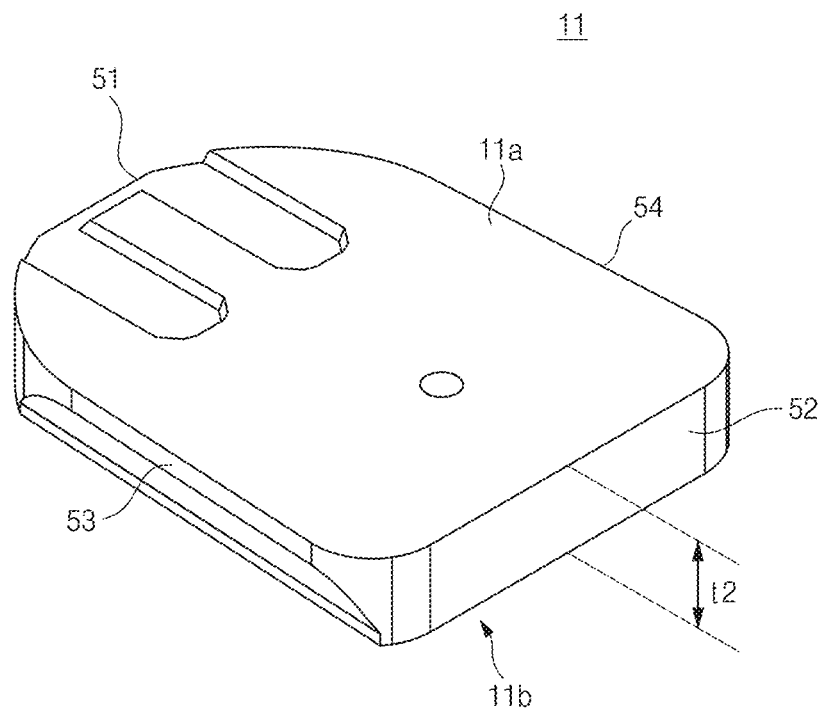
FIG. 5 illustrates a perspective view of a base body in a mount base for a rearview mirror according to an embodiment of the present disclosure.

Referring to FIG. 5, the base body 11 may include a first end portion 51, a second end portion 52 opposing the first end portion 51, a first side edge 53 extending between the first end portion 51 and the second end portion 52, and a second side edge 54 opposing the first side edge 53. A length of the base body 11 may be a distance between the first end portion 51 and the second end portion 52, and a width of the base body 11 may be a distance between the first side edge 53 and the second side edge 54. A thickness t2 of the base body 11 may be a distance between the first surface 11a and the second surface 11b.

The insert 12 may be embedded in the base body 11 to increase strength/stiffness of the base body 11. The insert 12 may include a second material, and the second material may be a metallic material. The second material may have higher stiffness than the first material, and the first material may be softer than the second material. For example, the second material of the insert 12 may be a stainless steel alloy such as SUS409L (tensile strength 399 MPa) and SUS304 (tensile strength 803 MPa).

Figure 6:
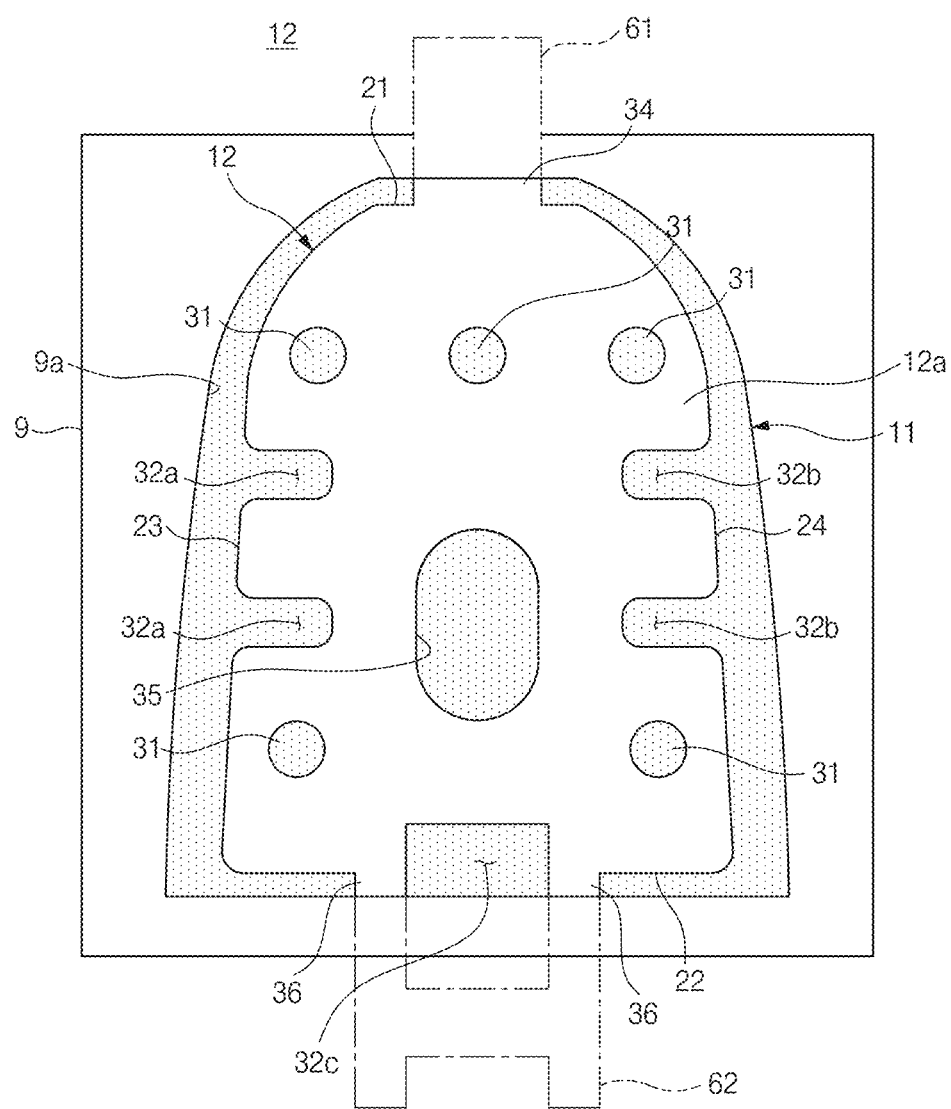
FIG. 6 illustrates a process of forming a mount base for a rearview mirror according to an embodiment of the present disclosure by insert molding.

According to an embodiment, the insert 12 may be embedded into the base body 11 by insert molding, so that the insert 12 and the base body 11 may form a unitary one-piece structure. Referring to FIG. 6, the insert 12 may be pre-placed in a mold 9. A molten resin for forming the base body 11 may be injected into the mold 9 and be cured so that the base body 11 and the insert 12 may form the unitary one-piece structure.

Figure 4:
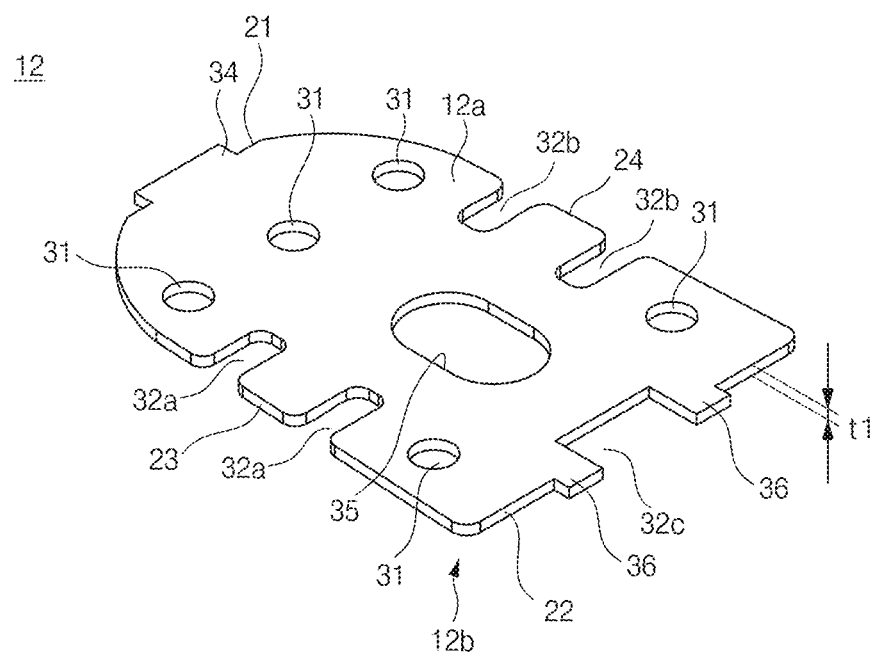
FIG. 4 illustrates a perspective view of an insert in a mount base for a rearview mirror according to an embodiment of the present disclosure.

The insert 12 may have a predetermined thickness t1 as illustrated in FIG. 4, and the base body 11 may have a predetermined thickness t2 as illustrated in FIG. 5. The thickness t1 of the insert 12 may be less than the thickness t2 of the base body 11, and the insert 12 may not protrude from the base body 11. For example, the thickness t1 of the insert 12 may be about 0.6 mm, and the thickness t2 of the base body 11 may be about 4.5 mm. The thickness t1 of the insert 12 may be 13-14% of the thickness t2 of the base body 11. When the thickness t1 of the insert 12 is greater than 13-14% of the thickness t2 of the base body 11, the weight of the insert 12 may be increased, and the distribution of a load transferred to the insert 12 may be reduced.

According to the embodiment illustrated in FIG. 3, as the insert 12 is embedded in the middle of the base body 11, exposure of the insert 12 to the outside of the base body 11 may be minimized. Specifically, the first surface 12a of the insert 12 may be offset from the first surface 11a of the base body 11 toward the second surface 11b of the base body 11. The second surface 12b of the insert 12 may be offset from the second surface 11b of the base body 11 toward the first surface 11a of the base body 11.

Referring to FIGS. 4 and 6, the insert 12 may include a first end portion 21, a second end portion 22 opposing the first end portion 21, a first side edge 23 extending between the first end portion 21 and the second end portion 22, and a second side edge 24 opposing the first side edge 23. A length of the insert 12 may be a distance between the first end portion 21 and the second end portion 22 and a width of the insert 12 may be a distance between the first side edge 23 and the second side edge 24. The thickness t1 of the insert 12 may be a distance between the first surface 12a and the second surface 12b.

Referring to FIG. 3, the mount base 10 may be received in a mirror mount 2. When a screw 5 is tightened to the mirror mount 2, the screw 5 may press the mount base 10 so that the mount base 10 may be mounted (fixed) to the windshield 6. The screw 5 may have a head 5a and an end portion 5b opposing the head 5a. The end portion 5b of the screw 5 may penetrate to a predetermined depth from the first surface 11a of the base body 11. Thus, the mirror mount 2 and the mount base 10 may be fixed to the windshield 6. When the screw 5 is tightened, an axial force may be generated in an axial direction of the screw 5. When the axial force is transferred to the mount base 10, the base body 11 may be deformed by the axial force. The windshield 6 may be likely to be damaged by the deformation of the base body 11, but the deformation of the base body 11 may be prevented by the insert 12.

Referring to FIG. 4, the insert 12 may be a flat plate having a plurality of holes 31, a plurality of recesses 32a, 32b, and 32c, and a slot 35.

The plurality of holes 31 may be provided in the insert 12. When the base body 11 is formed to surround the insert 12 by insert molding, the molten resin, which is the material of the base body 11, may pass through the plurality of holes 31 so that flowability of the molten resin may be improved. As the plurality of holes 31 are filled with the cured material of the base body 11, a bonding force between the base body 11 and the insert 12 may be increased.

A plurality of first recesses 32a may be recessed from the first side edge 23 toward the center of the insert 12, and a plurality of second recesses 32b may be recessed from the second side edge 24 toward the center of the insert 12. A third recess 32c may be recessed from the second end portion 22 toward the center of the insert 12. When the base body 11 is formed to surround the insert 12 by insert molding, the molten resin, which is the material of the base body 11, may pass through the plurality of recesses 32a, 32b, and 32c so that flowability of the molten resin may be improved. As the plurality of recesses 32a, 32b, and 32c are filled with the cured material of the base body 11, a bonding force between the base body 11 and the insert 12 may be increased. In addition, the weight of the insert 12 may be reduced by the plurality of recesses 32a, 32b, and 32c. When the axial force generated by the tightening of the screw 5 is transferred to the mount base 10, it may be uniformly distributed around the recesses 32a, 32b, and 32c of the insert 12.

The slot 35 may be provided in the center of the insert 12. A lengthwise or longitudinal axis of the slot 35 may be aligned with a lengthwise or longitudinal axis of the insert 12, and a widthwise or transverse axis of the slot 35 may be aligned with a widthwise or transverse axis of the insert 12. When the screw 5 is tightened to the mirror mount 2, the end portion 5b of the screw 5 may be aligned with the slot 35, and accordingly a material filling the slot 35 may support the axial force generated by the tightening of the screw 5. The position of the screw 5 may be adjusted along a longitudinal direction of the slot 35, so fastening stability of the screw 5 may be improved.

The slot 35 may be filled with a third material, and the third material may be the same material as the first material or may have a relatively lower yield strength than that of the first material. When the screw 5 is fastened, the load/stress transferred to the mount base 10 may be uniformly distributed through the third material filling the slot 35. For example, the third material may be the same material as that of the base body 11. As another example, the third material may be softer than the first material. As another example, the third material may be air. If the third material has a relatively higher yield strength than that of the first material, the load/stress distribution effect may be reduced while the axial force generated by the tightening of the screw 5 is transferred to the mount base 10. This may cause stress concentration on the windshield 6, resulting in damage to the windshield 6.

Referring to FIG. 6, when the insert 12 is embedded into the base body 11 by insert molding, the insert 12 may be pre-placed in a cavity 9a of the mold 9, and then the molten resin may be injected into the cavity 9a of the mold 9 and be cured so that the insert 12 may be integrally embedded in the base body 11, and the mount base 10 may be completely molded. The insert 12 may have a first positioning projection 61 and a second positioning projection 62. The first positioning projection 61 may protrude from the first end portion 21 of the insert 12 toward the outside of the base body 11, and the second positioning projection 62 may protrude from the second end portion 22 of the insert 12 toward the outside of the base body 11. The first positioning projection 61 and the second positioning projection 62 may oppose each other. When the insert 12 is pre-placed in the cavity 9a of the mold 9, the first and second positioning projections 61 and 62 may accurately regulate the position of the insert 12 in the cavity 9a of the mold 9. As the first positioning projection 61 and the second positioning projection 62 regulate the position of the insert 12 in the mold 9, the molding quality, molding stability, and productivity of the mount base 10 may be improved.

When the mount base 10 is formed by insert molding and separated from the cavity 9a of the mold 9, the first positioning projection 61 and the second positioning projection 62 protruding from the base body 11 may be cut. As the first positioning projection 61 is cut at the first end portion 51 of the base body 11, a first support projection 34, which is the remaining portion of the first positioning projection 61, may extend from the first end portion 21 of the insert 12 to the first end portion 51 of the base body 11. As the second positioning projection 62 is cut at the second end portion 52 of the base body 11, two second support projections 36, which are the remaining portions of the second positioning projection 62, may extend from the second end portion 22 of the insert 12 to the second end portion 52 of the base body 11. Accordingly, a cut-surface of the first support projection 34 may be exposed through the first end portion 51 of the base body 11. Cut-surfaces of the second support projections 36 may also be exposed through the second end portion 52 of the base body 11. As described above, considering that the insert 12 is partially exposed through the base body 11, the insert 12 may be made of a stainless steel material containing chromium (CR) in order to prevent rust or corrosion.

Figure 7:
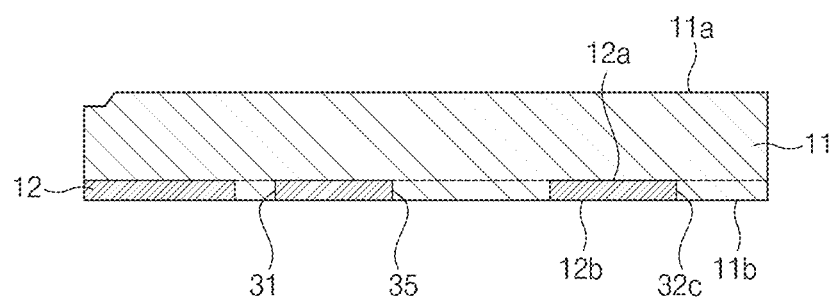
FIG. 7 illustrates a longitudinal sectional view of a mount base for a rearview mirror according to another embodiment of the present disclosure.

Referring to FIG. 7, the insert 12 may be embedded into a portion of the base body 11 adjacent to the second surface 11b. Specifically, the first surface 12a of the insert 12 may be offset from the first surface 11a of the base body 11 toward the second surface 11b of the base body 11, and the second surface 12b of the insert 12 may be flush with the second surface 11b of the base body 11.

Figure 8:
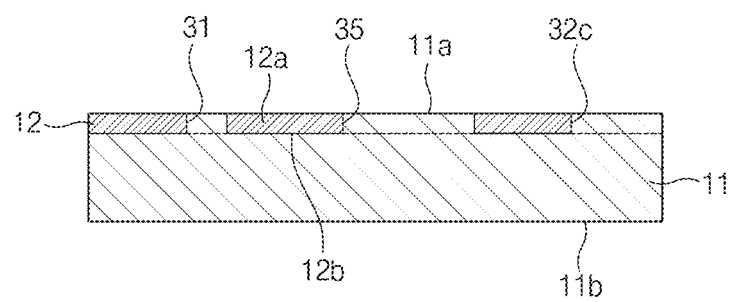
FIG. 8 illustrates a longitudinal sectional view of a mount base for a rearview mirror according to another embodiment of the present disclosure.

Referring to FIG. 8, the insert 12 may be embedded into a portion of the base body 11 adjacent to the first surface 11a. Specifically, the first surface 12a of the insert 12 may be flush with the first surface 11a of the base body 11 and the second surface 12b of the insert 12 may be offset from the second surface 11b of the base body 11 toward the first surface 11a of the base body 11.

Figure 9:
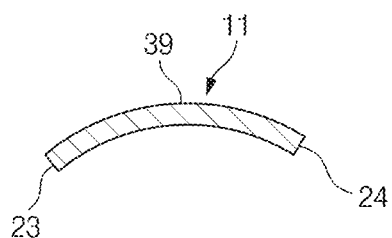
FIG. 9 illustrates a transverse sectional view of an insert in a mount base for a rearview mirror according to another embodiment of the present disclosure.

Referring to FIG. 9, the insert 12 may be curved with a predetermined curvature. Specifically, the insert 12 may be convex so that its center 39 may be positioned higher than the first side edge 23 and the second side edge 24. Thus, the axial force generated by the tightening of the screw 5 may be absorbed and distributed by the curve of the insert 12.

Figure 10:
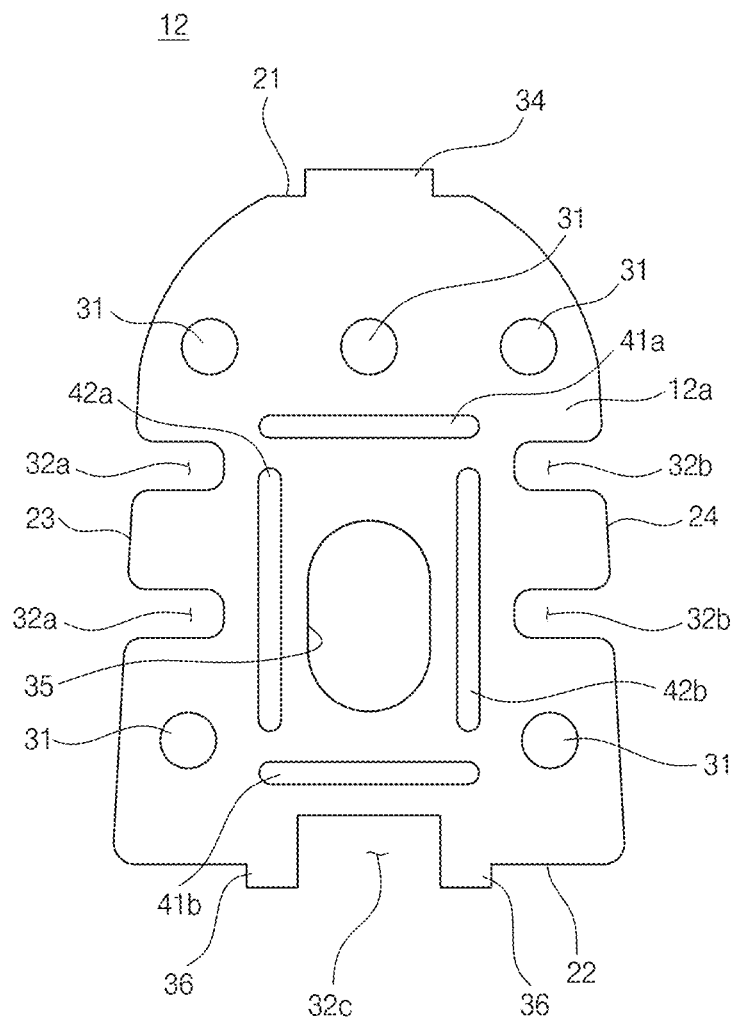
FIG. 10 illustrates a plan view of an insert in a mount base for a rearview mirror according to another embodiment of the present disclosure.

Referring to FIG. 10, the insert 12 may include a plurality of ribs 41a, 41b, 42a, and 42b provided on the first surface 12a or the second surface 12b. The plurality of ribs 41a, 41b, 42a, and 42b may include first and second transverse ribs 41a and 41b extending along the widthwise axis of the insert 12 and first and second longitudinal ribs 42a and 42b extending along the lengthwise axis of the insert 12. The first and second transverse ribs 41a and 41b may face each other in relation to the slot 35, and the first and second longitudinal ribs 42a and 42b may face each other in relation to the slot 35. The stiffness (longitudinal stiffness and transverse stiffness) of the insert 12 may be improved by the plurality of ribs 41a, 41b, 42a, and 42b.

Figure 11:
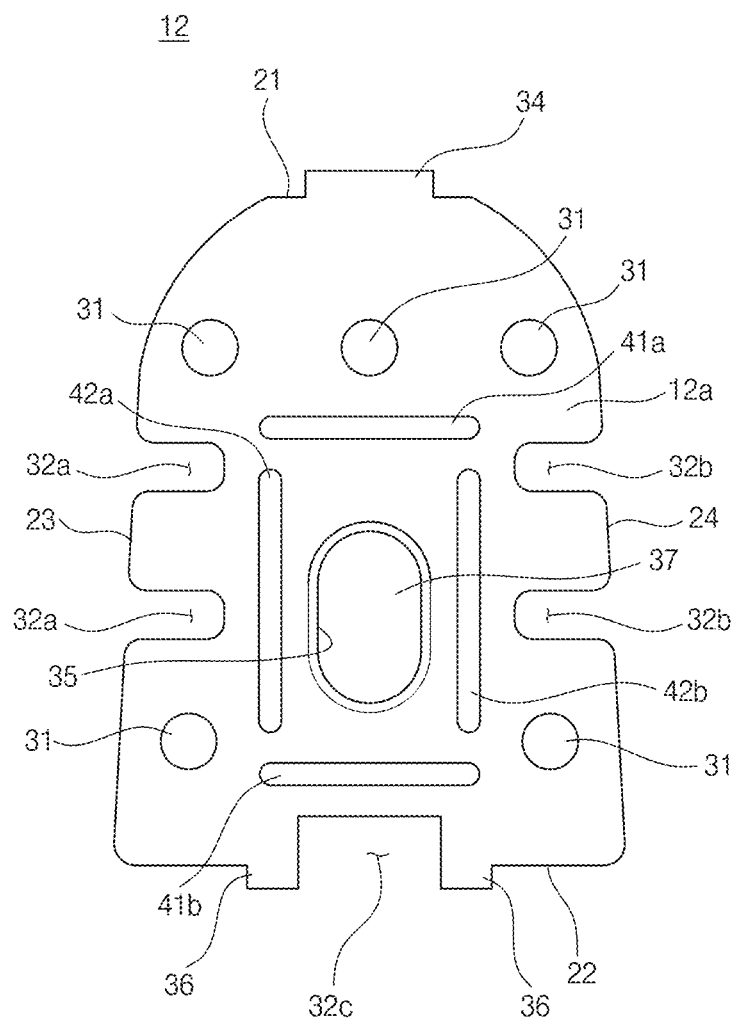
FIG. 11 illustrates a plan view of an insert in a mount base for a rearview mirror according to another embodiment of the present disclosure.

Referring to FIG. 11, the insert 12 may further include a closed wall 37 by which the slot 35 is closed. The closed wall 37 may be made of the same material as that of the insert 12 and a thickness of the closed wall 37 may be less than that of the slot 35.

Figure 12:
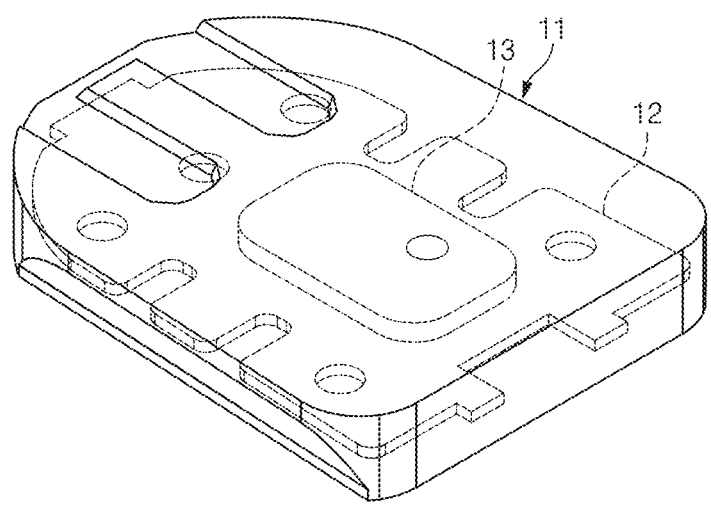
FIG. 12 illustrates a perspective view of a mount base for a rearview mirror according to another embodiment of the present disclosure.
Figure 13:
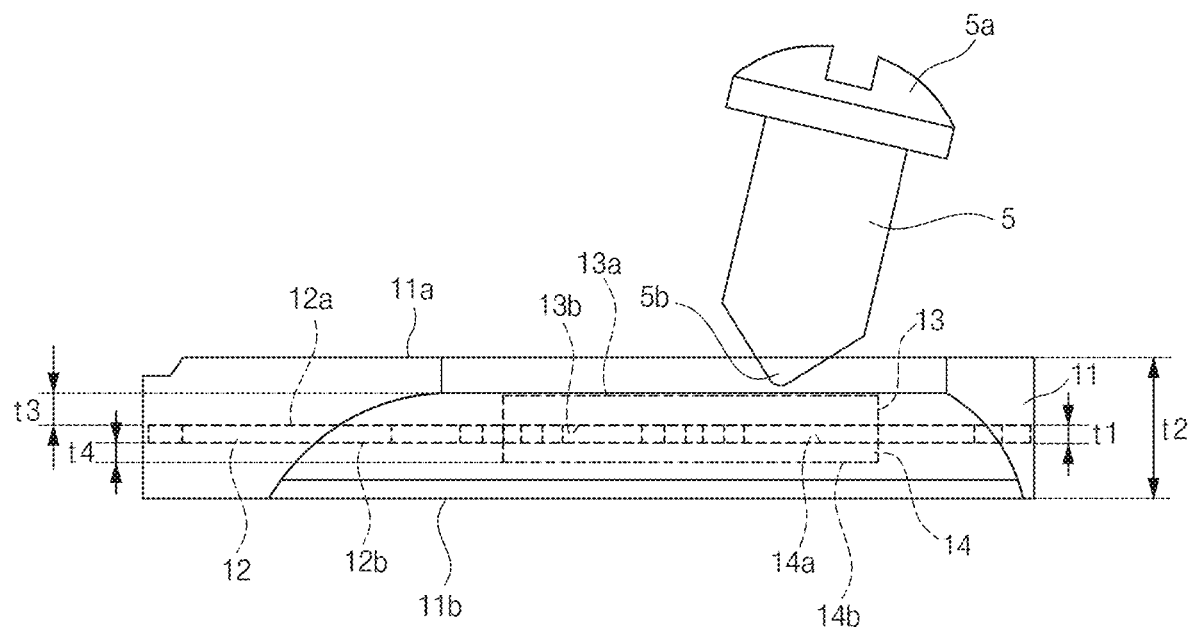
FIG. 13 illustrates a longitudinal sectional view of a mount base for a rearview mirror according to another embodiment of the present disclosure.

Referring to FIGS. 12 and 13, the mount base 10 may further include one or more stress absorbing members 13 and 14 or stress absorbing layers embedded in the base body 11. The stress absorbing members 13 and 14 may be aligned with the slot 35 of the insert 12. The stress absorbing members 13 and 14 may include a fourth material, and the fourth material may be softer than the first material. For example, the fourth material of the stress absorbing members 13 and 14 may be made of a soft material such as high-density polyethylene (HDPE), low-density polyethylene (LDPE), linear low density polyethylene (LLDPE), and silicone rubber (SR). When the axial force generated by the tightening of the screw 5 is transferred to the mount base 10, the axial force may be uniformly distributed by the stress absorbing members 13 and 14.

The stress absorbing members 13 and 14 may have an area larger than that of the slot 35 of the insert 12. Accordingly, the stress absorbing members 13 and 14 may be overlapped with the slot 35 of the insert 12.

Referring to FIG. 13, a first stress absorbing member 13 may contact or be adjacent to the first surface 12a of the insert 12. Specifically, the first stress absorbing member 13 may have a first surface 13a facing the interior of the vehicle and a second surface 13b facing the windshield 6. The first surface 13a of the first stress absorbing member 13 may be offset from the first surface 11a of the base body 11 toward the second surface 11b of the base body 11. The second surface 13b of the first stress absorbing member 13 may contact the first surface 12a of the insert 12. Since the first stress absorbing member 13 is adjacent to the first surface 11a of the base body 11, it may be closer to the screw 5 than a second stress absorbing member 14.

Referring to FIG. 13, the second stress absorbing member 14 may contact or be adjacent to the second surface 12b of the insert 12. Specifically, the second stress absorbing member 14 may have a first surface 14a facing the interior of the vehicle and a second surface 14b facing the windshield 6. The first surface 14a of the second stress absorbing member 14 may contact the second surface 12b of the insert 12. The second surface 14b of the second stress absorbing member 14 may be offset from the second surface 11b of the base body 11 toward the first surface 11a of the base body 11.

According to an embodiment, the thickness t2 of the base body 11 may be 4.5 mm, a thickness t3 of the first stress absorbing member 13 may be 0.5-1.3 mm, a thickness t4 of the second stress absorbing member 14 may be 0.5 mm, and the thickness t1 of the insert 12 may be 0.6 mm. The sum of the thickness t3 of the first stress absorbing member 13, the thickness t4 of the second stress absorbing member 14, and the thickness t1 of the insert 12 may be 1.6-2.4 mm. When the thickness t3 of the first stress absorbing member 13 is 0.5-1.3 mm, the stress generated by the tightening of the screw 5 may be minimized. When the end portion 5b of the screw 5 penetrates to a depth of about 1.8 mm from the first surface 11a of the base body 11, it may be acceptable without damage to or deformation of the base body 11. However, when the thickness t3 of the first stress absorbing member 13 exceeds 1.3 mm, a distance between the first surface 11a of the base body 11 and the first surface 13a of the first stress absorbing member 13 may be less than or equal to 0.81 mm, which may lead to a risk of damage to or deformation of the base body 11.

Figure 14:
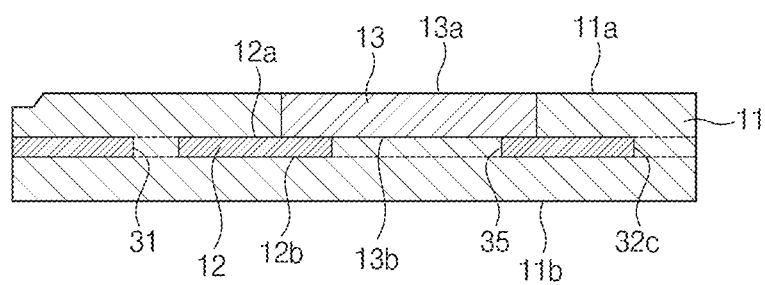
FIG. 14 illustrates a longitudinal sectional view of a mount base for a rearview mirror according to another embodiment of the present disclosure.

Referring to FIG. 14, in the mount base 10 for a rearview mirror according to another embodiment of the present disclosure, the first surface 13a of the first stress absorbing member 13 may be flush with the first surface 11a of the base body 11, and the first stress absorbing member 13 may be exposed through the first surface 11a of the base body 11. The second stress absorbing member 14 may be omitted.

Figure 15:
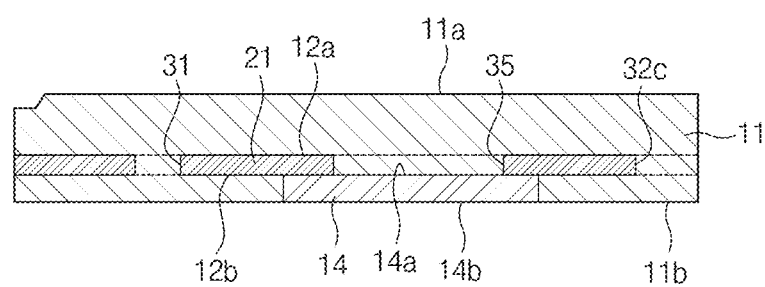
FIG. 15 illustrates a longitudinal sectional view of a mount base for a rearview mirror according to another embodiment of the present disclosure.

Referring to FIG. 15, in the mount base 10 according to another embodiment of the present disclosure, the second surface 14b of the second stress absorbing member 14 may be flush with the second surface 11b of the base body 11, and the second stress absorbing member 14 may be exposed through the second surface 11b of the base body 11. The first stress absorbing member 13 may be omitted.

Figure 16:
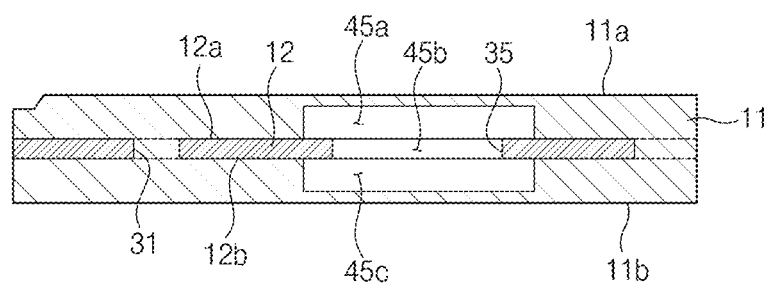
FIG. 16 illustrates a longitudinal sectional view of a mount base for a rearview mirror according to another embodiment of the present disclosure.

Referring to FIG. 16, the mount base 10 for a rearview mirror according to another embodiment of the present disclosure may include a plurality of air layers 45a, 45b, and 45c aligned with the slot 35 of the insert 12 within the base body 11. A first air layer 45a may face the first surface 12a of the insert 12, a second air layer 45b may be located within the slot 35 of the insert 12, and a third air layer 45c may face the second surface 12b of the insert 12. The first air layer 45a and the third air layer 45c may have an area larger than that of the slot 35 of the insert 12, and accordingly the first and third air layers 45a and 45c may be overlapped with the slot 35 of the insert 12.

As set forth above, the mount base for a rearview mirror according to embodiments of the present disclosure may achieve high stiffness and weight reduction, while having high resistance to deformation, and being manufactured at relatively low cost.

According to embodiments of the present disclosure, when the screw is tightened, the deformation of the base body may be minimized or prevented by the insert embedded in the base body, and thus damage to the windshield may be prevented.

According to embodiments of the present disclosure, by using the resin material, which is used for insert molding, instead of a sintered stainless steel alloy used in the related art, cost and weight may be significantly reduced, and productivity and profitability may be improved.

According to embodiments of the present disclosure, by applying the base body made of the resin material to the mount base, rattle noise may be prevented between the windshield and the mount base. Also, rust or corrosion may be prevented. Thus, improved quality may be achieved.

Hereinabove, although the present disclosure has been described with reference to specific embodiments and the accompanying drawings, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A mount base for a rearview mirror, the mount base comprising:
   a base body including a first material;
   an insert embedded in the base body, and including a second material; and
   at least one stress absorbing member embedded in the base body,
   wherein the base body has a first surface and a second surface opposing the first surface,
   wherein the insert has a first surface and a second surface opposing the first surface,
   wherein the first material is softer than the second material,
   wherein the second material has higher stiffness than the first material,
   wherein the base body and the insert form a unitary one-piece structure,
   wherein the insert includes a slot provided in the center thereof, and
   wherein the stress absorbing member is overlapped with the slot of the insert.

2. The mount base according to claim 1, wherein the insert includes a plurality of holes.

3. The mount base according to claim 1, wherein the insert includes a plurality of recesses provided in a side edge, an end portion, or a side edge and end portion thereof.

4. The mount base according to claim 1,
   wherein a longitudinal axis of the slot is aligned with a longitudinal axis of the insert.

5. The mount base according to claim 4, wherein the insert further includes a closed wall by which the slot is closed.

6. The mount base according to claim 4, further comprising a third material with which the slot is filled,
   wherein the third material is the same material as the first material or is softer than the first material.

7. The mount base according to claim 1, wherein a thickness of the insert is less than that of the base body.

8. The mount base according to claim 1, wherein the first surface of the insert is offset from the first surface of the base body toward the second surface of the base body, and
   wherein the second surface of the insert is offset from the second surface of the base body toward the first surface of the base body.

9. The mount base according to claim 1, wherein the first surface of the insert is offset from the first surface of the base body toward the second surface of the base body, and
   wherein the second surface of the insert is flush with the second surface of the base body.

10. The mount base according to claim 1, wherein the first surface of the insert is flush with the first surface of the base body, and
    wherein the second surface of the insert is offset from the second surface of the base body toward the first surface of the base body.

11. The mount base according to claim 1, wherein the insert is curved with a predetermined curvature.

12. The mount base according to claim 1, wherein the insert further includes a transverse rib extending along a width direction of the insert and a longitudinal rib extending along a longitudinal direction of the insert.

13. The mount base according to claim 1, wherein the insert further includes at least one support projection extending from an end portion of the insert to an end portion of the base body.

14. The mount base according to claim 1,
    wherein the stress absorbing member includes a fourth material, which is softer than the first material.

15. The mount base according to claim 1, further comprising a first stress absorbing member embedded in the base body and aligned with a slot of the insert,
    wherein the first stress absorbing member contacts the first surface of the insert.

16. The mount base according to claim 1, further comprising a second stress absorbing member embedded in the base body and aligned with a slot of the insert,
    wherein the second stress absorbing member contacts the second surface of the insert.

17. The mount base according to claim 1, further comprising a plurality of air layers aligned with a slot of the insert within the base body.

* * * * *